US009869816B2

(12) United States Patent
Ishikura et al.

(10) Patent No.: US 9,869,816 B2
(45) Date of Patent: Jan. 16, 2018

(54) LIGHT COMBINING/DIVIDING ELEMENT AND LIGHT MODULATOR

(71) Applicant: FUJIKURA LTD., Tokyo (JP)

(72) Inventors: Norihiro Ishikura, Sakura (JP); Kazuhiro Goi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/342,367

(22) Filed: Nov. 3, 2016

(65) Prior Publication Data
US 2017/0131471 A1     May 11, 2017

(30) Foreign Application Priority Data
Nov. 5, 2015   (JP) ................................. 2015-217763

(51) Int. Cl.
| G02B 6/125 | (2006.01) |
| G02B 6/122 | (2006.01) |
| G02B 6/12 | (2006.01) |
| G02B 6/28 | (2006.01) |
| G02F 1/225 | (2006.01) |
| G02F 1/21 | (2006.01) |

(52) U.S. Cl.
CPC .......... *G02B 6/125* (2013.01); *G02B 6/1228* (2013.01); *G02B 6/2813* (2013.01); *G02F 1/2257* (2013.01); *G02B 2006/121* (2013.01); *G02B 2006/1215* (2013.01); *G02B 2006/12097* (2013.01); *G02F 2001/212* (2013.01)

(58) Field of Classification Search
CPC ............................ G02B 6/1228; G02B 6/2813
See application file for complete search history.

(56) References Cited

U.S. PATENT DOCUMENTS

| 7,221,843 B2 * | 5/2007 | Aalto .................. | G02B 6/1228 385/129 |
| 2013/0259425 A1 * | 10/2013 | Okayama .............. | G02B 6/305 385/43 |

FOREIGN PATENT DOCUMENTS

| JP | 2000-221345 A | 8/2000 |
| JP | 2013-137360 A | 7/2013 |

OTHER PUBLICATIONS

Bogaerts et. al., "Low-loss, low-cross-talk crossings for silicon-on-insulator nanophotonic waveguides" Optics Letters, Oct. 1, 2007, vol. 32, No. 19, pp. 2801-2803 (3 pages).

* cited by examiner

*Primary Examiner* — Omar R Rojas
(74) *Attorney, Agent, or Firm* — Westerman, Hattori, Daniels & Adrian (57) ABSTRACT

Provided is a light combining/dividing element which allows generation of reflected light to be suppressed, as compared with a conventional light combining/dividing element. A core of the light combining/dividing element includes an MMI part which is connected to a first core and to each of a second core and a third core. A width of a rib of a rib waveguide of the MMI part becomes narrower from a width equal to that of a channel waveguide to a width equal to that of the first core.

6 Claims, 4 Drawing Sheets

LIGHT COMBINING/DIVIDING ELEMENT AND LIGHT MODULATOR

This Nonprovisional application claims priority under 35 U.S.C. §119 on Patent Application No. 2015-217763 filed in Japan on Nov. 5, 2015, the entire contents of which are hereby incorporated by reference.

TECHNICAL FIELD

The present invention relates to a light combining/dividing element which includes a core made of a semiconductor. Furthermore, the present invention relates to a light modulator which includes such a light combining/dividing element.

BACKGROUND ART

In the field of optical communications, semiconductor substrates on each of which a plurality of semiconductor optical elements are integrated have been widely used. On such a semiconductor substrate, a light waveguide which includes a core made of a semiconductor is formed by a process that is highly compatible with a process for forming semiconductor elements. Such a light waveguide is used to, for example, connect a semiconductor element to another semiconductor element.

On such a semiconductor substrate, a light combining/dividing element is formed in some cases. Note, here, that a light combining/dividing element indicates an element having (i) a function of combining rays of light, having been caused to enter a respective plurality of light waveguides, so that a ray of light is outputted from a single light waveguide and (ii) a function of dividing a ray of light, having been caused to enter the single light waveguide, so that rays of light are outputted from the respective plurality of light waveguides.

Each of Patent literatures 1 and 2 discloses a light combining/dividing element configured such that a single light waveguide (first waveguide) is connected to two light waveguides (second and third waveguides) via a multi-mode interference (MMI) section, that is, a 1×2 light combining/dividing element having an MMI section.

FIG. 1 of Patent Literature 2 illustrates a light combining/dividing element configured such that (1) a first waveguide (the second input/output waveguide section illustrated in FIG. 1) is connected to an MMI section (the first multi-mode waveguide section illustrated in FIG. 1) via a first tapered section (the second multi-mode waveguide section and the fourth input/output waveguide section each illustrated in FIG. 1) and (2) a second waveguide and a third waveguide (the first input/output waveguide section illustrated in FIG. 1) are each connected to the MMI section via a second tapered section (the third input/output waveguide section illustrated in FIG. 1).

According to the above configuration, a difference in effective refractive index between the first waveguide and the MMI section is reduced by an effective refractive index of the first tapered section. It is therefore possible to suppress light loss resulting from light reflection caused by connecting the first waveguide to the MMI section.

Meanwhile, Non-Patent Literature 1 discloses a light crossing element configured such that a first waveguide and a second waveguide are crossed on an identical plane surface. As illustrated in FIG. 2 of Non-Patent Literature 1, the light crossing element includes the first waveguide and the second waveguide which are provided so as to be perpendicular to each other, and an expanded region is formed in a vicinity of an crossing at which the first waveguide and the second waveguide are crossed.

A shape of the expanded region has fourfold symmetry, when the expanded region is viewed from above. The expanded region is made up of (i) a first ellipse whose long axis matches a central axis of the first waveguide and (ii) a second ellipse whose long axis matches a central axis of the second waveguide. The expanded region is arranged so as to be thinner than each of the first waveguide and the second waveguide.

According to the above configuration, it is possible to reduce crosstalk between (i) light guided through the first waveguide and (ii) light guided through the second waveguide, while suppressing light loss resulting from light scattering which occurs at the crossing.

According the light combining/dividing element disclosed in Patent Literature 2, it is considered that a light combining function and a light dividing function are realized with active use of interference that is an interaction between rays of light which interaction occurs in the MMI section.

Meanwhile, according to the light crossing element disclosed in Non-Patent Literature 1, it is considered that an interaction, between (i) light guided through the first waveguide and (ii) light guided through the second waveguide, causes crosstalk between these rays of light. That is, according to the light crossing element, it is considered that, by suppressing such an interaction as much as possible, crossing of rays of light is realized while crosstalk between the rays of light is being reduced.

As such, the light combining/dividing element and the light crossing element are inventions based on respective opposite ideas about an interaction between rays of light.

CITATION LIST

Patent Literature

[Patent Literature 1]
Japanese Patent Application Publication Tokukai No. 2000-221345 (Publication date: Aug. 11, 2000)
[Patent Literature 2]
Japanese Patent Application Publication Tokukai No. 2013-137360 (Publication date: Jul. 11, 2013)

Non-Patent Literature

[Non-Patent Literature 1]
Wim Bogaerts et. al., OPTICS LETTERS, Vol. 32, No. 19, 2801-2803, Oct. 1, 2007

SUMMARY OF INVENTION

Technical Problem

A semiconductor substrate on which a plurality of semiconductor elements are integrated includes a plurality of light combining/dividing elements. Therefore, it is strongly demanded that generation of reflected light (returned light) in each of the plurality of light combining/dividing elements be suppressed as much as possible. Reflected light not only increases light loss in a light combining/dividing element, but also causes operation of an integrated optical element on which a plurality of semiconductor elements are integrated to be unstable. The inventors of the present invention considered that the light combining/dividing element disclosed in each of Patent Literatures 1 and 2 left room to suppress generation of reflected light.

As has been described, according to the light crossing element of Non-Patent Literature 1, it is possible to (i) suppress light loss resulting from light scattering which occurs at the crossing and (ii) reduce crosstalk, by forming the expanded region in the vicinity of the crossing.

However, it is not obvious whether a significant effect can be achieved by applying a concept of the expanded region of the light crossing element to the light combining/dividing element. Furthermore, it is not clear how the concept of the expanded region should be embodied and applied to the light combining/dividing element.

The present invention has been made in view of the above problems, and an object of the present invention is to provide a light combining/dividing element which allows generation of reflected light to be suppressed, as compared with a conventional light combining/dividing element.

Solution to Problem

In order to attain the above object, a light combining/dividing element of the present invention is a light combining/dividing element, including: a core made of a semiconductor, the core including: a first core; second through N-th cores each having a thickness equal to that of the first core, the second through N-th cores being arranged in parallel to each other; and an multi-mode interference (MMI) part having a first end surface and a second end surface, the first end surface being connected to the first core, the second end surface facing the first end surface and being connected to each of the second through N-th cores, the MMI part including: a channel waveguide including the second end surface, the channel waveguide having a width greater than a sum of respective widths of the second through N-th cores; and a rib waveguide including the first end surface, the rib waveguide including (i) a rib having a thickness equal to that of each of the first through N-th cores and (ii) slabs each having a thickness thinner than that of the rib, the rib having a width which becomes narrower from a width equal to that of the channel waveguide to a width equal to that of part of the first core which part is located at a boundary between the first core and the rib.

According to the above configuration, the rib waveguide has the slabs. This makes it possible to smoothly vary an equivalent refractive index (indicative of an effective refractive index of a micro-waveguide) between the channel waveguide and the first core.

Therefore, according to the light combining/dividing element of the present invention, it is possible to suppress Fresnel reflection that occurs at an interface at which an equivalent refractive index varies greatly, and accordingly possible to suppress generation of reflected light which can be generated in the light combining/dividing element.

Advantageous Effects of Invention

According to the present invention, it is possible to provide a light combining/dividing element which allows generation of reflected light to be suppressed, as compared with a conventional light combining/dividing element.

BRIEF DESCRIPTION OF DRAWINGS (a) of FIG. 1 is a perspective view illustrating a configuration of a light combining/dividing element in accordance with Embodiment 1 of the present invention. (b) of FIG. 1 is a perspective view illustrating a configuration of a core included in the light combining/dividing element illustrated in (a) of FIG. 1.

(a) through (c) of FIG. 2 are cross-sectional views each illustrating a configuration of an MMI part of the core included in the light combining/dividing element illustrated in (a) of FIG. 1.

(a) through (d) of FIG. 3 are top views illustrating respective configurations of cores which are Variations 1 through 4 of the core illustrated in (b) of FIG. 1.

DESCRIPTION OF EMBODIMENTS

[Embodiment 1]

Figure 1:
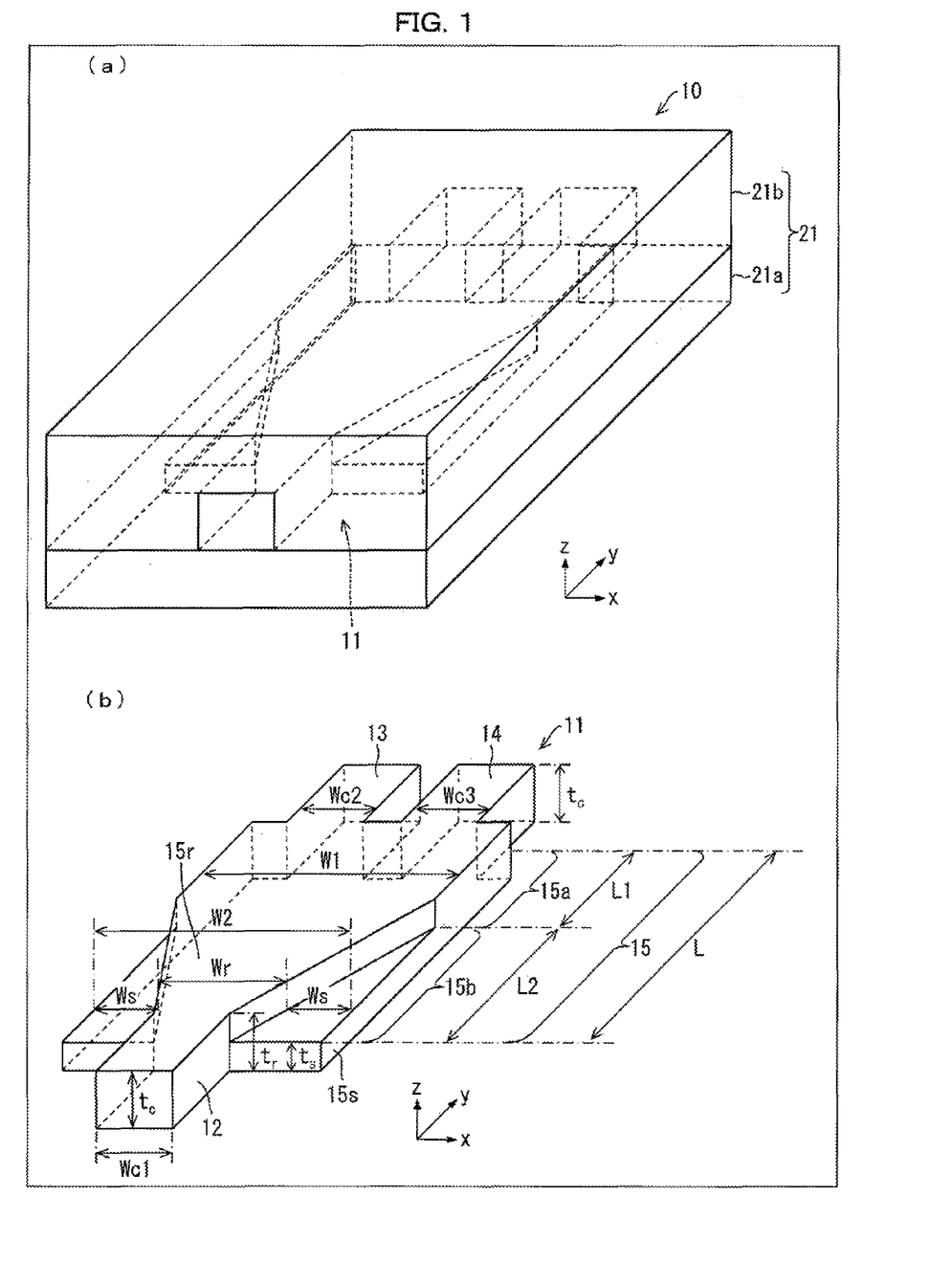
Figure 2:
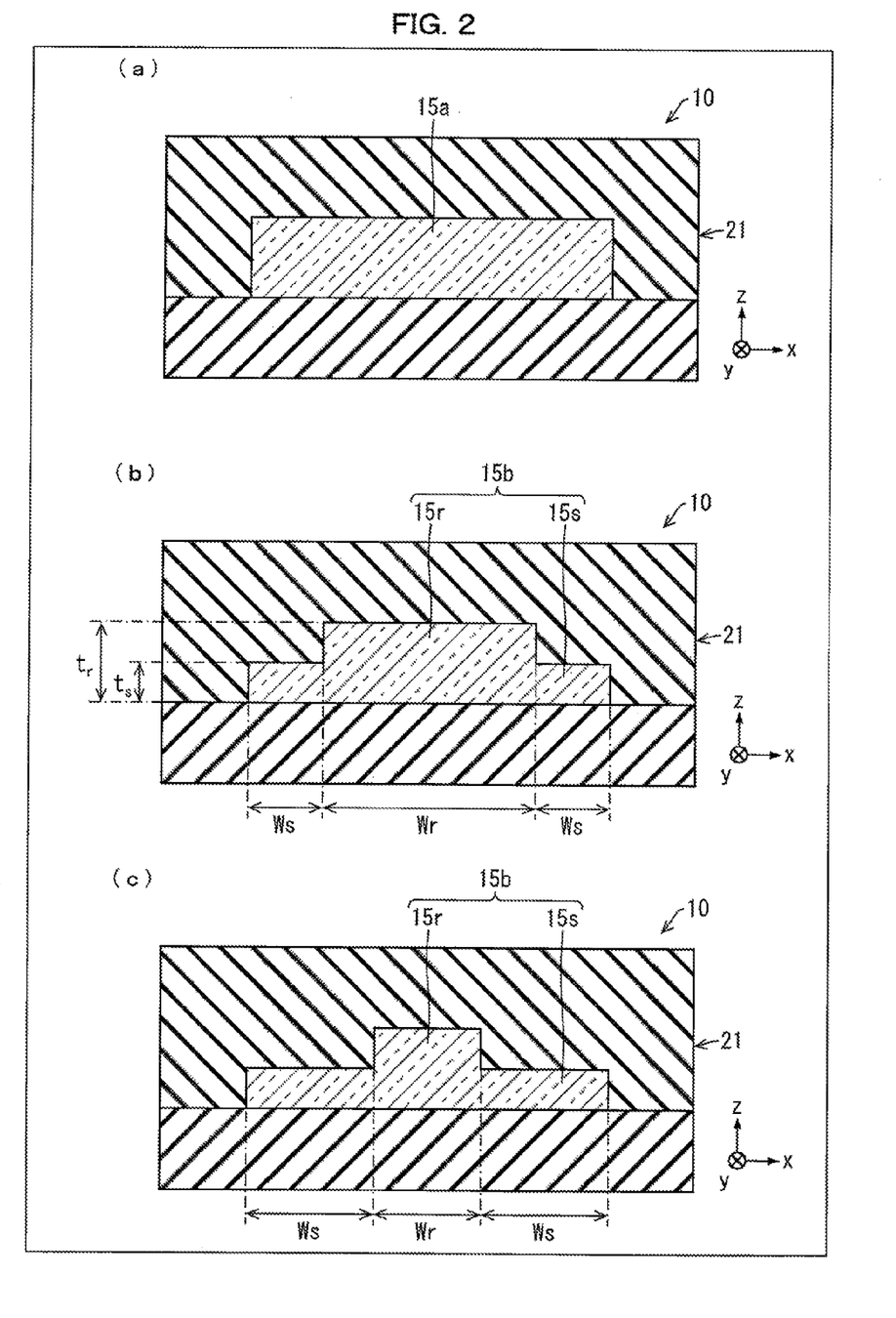

The following description will discuss, with reference to FIGS. 1 and 2, a light combining/dividing element 10 in accordance with Embodiment 1 of the present invention. (a) of FIG. 1 is a perspective view illustrating a configuration of the light combining/dividing element 10 in accordance with Embodiment 1. (b) of FIG. 1 is a perspective view illustrating a configuration of a core 11 included in the light combining/dividing element 10. (a) through (c) of FIG. 2 are cross-sectional views each illustrating a configuration of a multi-mode interference (MMI) part 15 of the core 11 included in the light combining/dividing element 10.

(Light Combining/Dividing Element 10)

As illustrated in (a) of FIG. 1, the light combining/dividing element 10 includes the core 11 and a cladding 21 which is made up of a lower cladding 21a and an upper cladding 21b. The core 11 is provided on an upper surface of the lower cladding 21a. The upper cladding 21b is provided on the upper surface of the lower cladding 21a and an upper surface of the core 11 so as to surround the core 11.

The core 11 is made of a semiconductor having a high refractive index. Note that such a semiconductor is typified by, for example, silicon. The cladding 21 is made of a material having a refractive index lower than that of a material of which the core 11 is made. For example, in a case where silicon is employed as the material of the core 11, silica can be employed as the material of the cladding 21.

As illustrated in (b) of FIG. 1, the core 11 of Embodiment 1 includes (1) a first core 12, (2) a second core 13 and a third core 14 each having a thickness equal to that of the first core 12, the second core 13 and the third core 14 being arranged in parallel to each other, and (3) the multi-mode interference (MMI) part 15 having (i) a first end surface (end surface located in a negative direction of a y-axis out of coordinate axes illustrated in FIG. 1) which is connected to the first core 12 and (ii) a second end surface (end surface located in a positive direction of the y-axis out of the coordinate axes illustrated in FIG. 1) which faces the first end surface and which is connected to each of the second core 13 and the third core 14. The MMI part 15 includes (i) a channel waveguide 15a including the second end surface and (ii) a rib waveguide 15b including the first end surface.

In Embodiment 1, a core of a channel type whose cross section, perpendicular to a direction in which light is guided, has a quadrangular shape is employed as each of the first core 12, the second core 13, and the third core 14. As described in the above (1) and (2), the first core 12, the second core 13, and the third core 14 have respective identical thicknesses tc. The second core 13 and the third core 14 have respective identical widths Wc, that is, a width Wc2 of the second core 13 is equal to a width Wc3 of the third core 14. Note that a width Wc1 of the first core 12 can be equal to the width Wc of each of the second core 13 and third core 14. In Embodiment 1, the first core 12, the second core 13, and the third cores 14 have respective identical widths Wc. A length L of the MMI part 15 is represented by L=L1+L2, assuming that the channel waveguide 15a has a length L1 and the rib waveguide 15b has a length L2, which channel waveguide 15a and rib waveguide 15b constitute the MMI part 15 described in the above (3).

A width W1 of the channel waveguide 15a is greater than a sum of (i) the width Wc2 of part of the second core 13 which part is connected to the second end surface and (ii) the width Wc3 of part of the third core 14 which part is connected to the second end surface (W1>Wc+Wc(=Wc2+Wc3)).

The rib waveguide 15b is located between the channel waveguide 15a and the first core 12. The rib waveguide 15b includes a rib 15r and slabs 15s. A thickness tr of the rib 15r is equal to the thickness tc of each of the first core 12, the second core 13, and the third core 14 (tr=tc). A thickness ts of each of the slabs 15s is thinner than the thickness tr of the rib 15r (ts<tr). That is, the rib waveguide 15b is a waveguide of a rib type.

Figure 3:
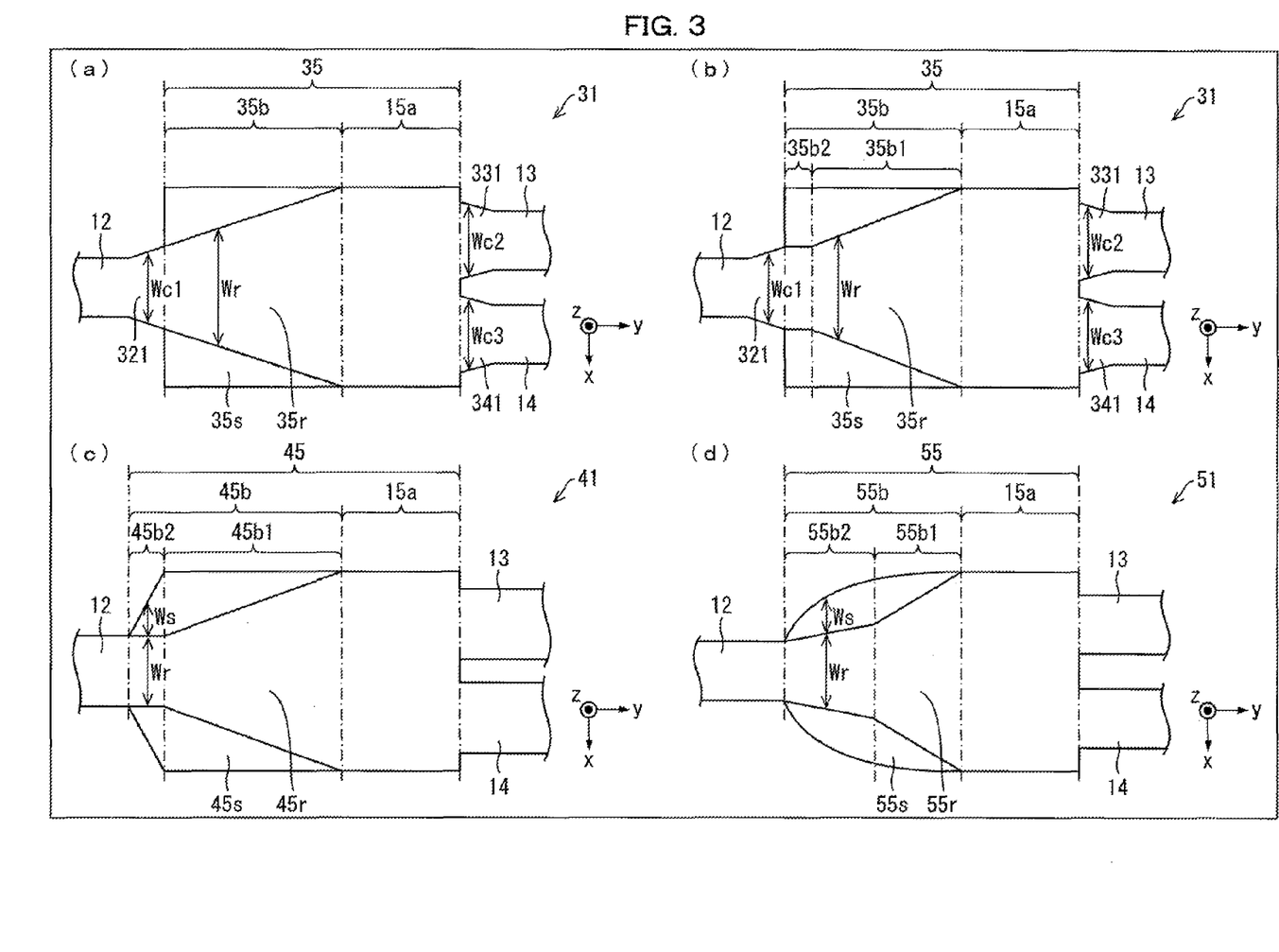

Here, a coordinate system illustrated in each of (a) and (b) of FIG. 1 will be defined as follows: assuming that a plane parallel to a boundary plane between the lower cladding 21a and the core 11 is an x-y plane, (1) a z-axis is an axis which is parallel to a direction perpendicular to the x-y plane, that is, parallel to a thickness direction of the core 11, a positive direction of the z-axis being set to such a direction that the upper cladding 21b is viewed from the lower cladding 21a; (2) the y-axis is an axis which is parallel to, out of directions included in the x-y plane, a direction in which the first core 12 extends, the positive direction of the y-axis being set to such a direction that the second core 13 and the third core 14 are viewed from the first core 12; and (3) an x-axis is an axis which is parallel to, out of the directions included in the x-y plane, a width direction of the first core 12, a direction of the x-axis being set such that the x-axis, the y-axis, and the z-axis constitute a right-handed coordinate system. A coordinate system illustrated in each of FIGS. 2 and 3 is defined, as with the case of that illustrated in FIG. 1.

(a) of FIG. 2 is a cross-sectional view illustrating a configuration of the MMI part 15 of the core 11 included in the light combining/dividing element 10. (a) of FIG. 2 illustrates a cross section of the channel waveguide 15a which cross section is parallel to a z-x plane. Specifically, the cross section of the channel waveguide 15a illustrated in (a) of FIG. 2 is a cross section obtained at a boundary between the channel waveguide 15a and the rib waveguide 15b. (b) and (c) of FIG. 2 are cross-sectional views each illustrating the configuration of the MMI part 15 of the core 11 included in the light combining/dividing element 10. (b) and (c) of FIG. 2 each illustrate a cross section of the rib waveguide 15b which cross section is parallel to the z-x plane. Specifically, the cross section of the rib waveguide 15b illustrated in (b) of FIG. 2 is a cross section obtained at a middle point of the rib waveguide 15b, and the cross section of the rib waveguide 15b illustrated in (c) of FIG. 2 is a cross section obtained at a boundary between the rib waveguide 15b and the first core 12.

As illustrated in (a) of FIG. 2, the cross section of the channel waveguide 15a has a quadrangular shape. The width W1 of the channel waveguide 15a is uniform across the channel waveguide 15a. That is, the width W1 of the channel waveguide 15a is uniform from a boundary between (i) the channel waveguide 15a and (ii) the second core 13 and the third core 14 to the boundary between the channel waveguide 15a and the rib waveguide 15b.

As illustrated in (b) and (c) and FIG. 2, the rib waveguide 15b includes (i) the rib 15r located in the middle of the rib waveguide 15b and (ii) the slabs 15s projecting from respective side surfaces of the rib 15r (two surfaces each perpendicular to the x-y plane, out of four surfaces of the rib 15r) toward an outside of the rib 15r. A cross section of each of the rib 15r and the slabs 15s has a quadrangular shape. As has been described, tr>ts.

In Embodiment 1, a width W2 (W2=Wr+Ws+Ws) of the rib waveguide 15b is uniform across the rib waveguide 15b. That is, the width W2 of the rib waveguide 15b is uniform from the boundary between the channel waveguide 15a and the rib waveguide 15b to the boundary between the rib waveguide 15b and the first core 12.

A width Wr of the rib 15r is arranged such that (1) Wr=W1 at the boundary between the channel waveguide 15a and the rib waveguide 15b, (2) Wr=Wc at the boundary between the rib waveguide 15b and the first core 12, and (3) the width Wr continuously becomes narrower as the rib 15r extends from the boundary between the channel waveguide 15a and the rib waveguide 15b to the boundary between the rib waveguide 15b and the first core 12. In Embodiment 1, as the rib 15r extends from the boundary between the channel waveguide 15a and the rib waveguide 15b to the boundary between the rib waveguide 15b and the first core 12, the width Wr of the rib 15r linearly becomes narrower so as to be ultimately equal to the width of part of the first core 12 which part is located at a boundary between the first core 12 and the rib 15r. In other words, the width Wr is represented as a linear function of a distance from the boundary between the channel waveguide 15a and the rib waveguide 15b which linear function exhibits a negative slope.

In Embodiment 1, a width Ws of each of the slabs 15s is arranged such that (1) Ws=0 (zero) at the boundary between the rib waveguide 15b and the channel waveguide 15a (at an end of the rib waveguide 15b which end is located in the positive direction of the y-axis), (2) Ws=(W1−Wc)/2 at the boundary between the rib waveguide 15b and the first core 12 (at an end of the rib waveguide 15b which end is located in the negative direction of the y-axis), and (3) the width Ws continuously becomes greater so as to compensate for an amount by which the width Wr becomes narrower, as the each of the slabs 15s extends from the boundary between the channel waveguide 15a and the rib waveguide 15b to the boundary between the rib waveguide 15b and the first core 12. In Embodiment 1, as the each of the slabs 15s extends from the boundary between the channel waveguide 15a and the rib waveguide 15b to the boundary between the rib waveguide 15b and the first core 12, the width Ws of the each of the slabs 15s linearly becomes greater. In other words, the width Ws is represented as a linear function of the distance from the boundary between the channel waveguide 15a and the rib waveguide 15b which linear function exhibits a positive slope.

According to the above configuration, it is possible to smoothly connect, at a boundary between the rib 15r and the channel waveguide 15a, the rib waveguide 15b to the channel waveguide 15a. It is therefore possible to further suppress Fresnel reflection which can occur at the boundary between the channel waveguide 15a and the rib waveguide 15b, and accordingly possible to further suppress generation of reflected light.

(b) of FIG. 2 illustrates a cross section of the light combining/dividing element 10 which cross section is obtained at the middle point of the rib waveguide 15b, and (c) of FIG. 2 illustrates the cross section of the light combining/dividing element 10 which cross section is obtained at the boundary between the rib waveguide 15b and the first core 12. Therefore, the width Ws illustrated in (b) of FIG. 2 is half the width Ws illustrated in (c) of FIG. 2.

(Function of Light Combining/Dividing Element 10)

In a case where the light combining/dividing element 10 is arranged such that a ray of light is caused to enter the first core 12, rays of light are caused to exit from the second core 13 and the third core 14, respectively. That is, in a case where (i) the first core 12 is used as a light entering port and (ii) each of the second core 13 and the third core 14 is used as a light exiting port, the light combining/dividing element 10 functions as a light dividing element, and divides a ray of light, having been caused to enter the first core 12, into rays of light to be caused to exit from the second core 13 and the third core 14, respectively.

In a case where the light combining/dividing element 10 is arranged such that the light entering port and the light exiting port are reversed so that rays of light are caused to enter the second core 13 and the third core 14, respectively, a ray of light is caused to exit from the first core 12. That is, in a case where (i) each of the second core 13 and the third core 14 is used as the light entering port and (ii) the first core 12 is used as the light exiting port, the light combining/dividing element 10 functions as a light combining element, and combines rays of light, having been caused to enter the second core 13 and the third core 14, respectively, into a ray of light to be caused to exit from the first core 12.

By thus selecting, as a light entering port(s), (i) the first core 12 or (ii) the second core 13 and the third core 14, it is possible to cause the light combining/dividing element 10 to function as a light dividing element or as a light combining element.

Inside the MMI part 15, two rays of light interfere with each other. By adjusting the length L of the MMI part 15, it is possible to arbitrarily control a degree of interference of the two rays of light between (i) such a degree that the two rays of light mutually increase intensity of the two rays of light and (ii) such a degree that the two rays of light mutually decrease the intensity of the two rays of light. For example, in a case where (i) two rays of light are caused to enter the second core 13 and the third core 14, respectively, and (ii) it is intended that intensity of a ray of light to be caused to exit from the first core 12 be maximized, the length L of the MMI part 15 only needs to be determined so that the two rays of light interfere with each other in such a way that the two rays of light mutually increase intensity of the two rays of light.

(Effect of Light Combining/Dividing Element 10)

The light combining/dividing element 10 includes the core 11 which is arranged such that the rib waveguide 15b has the slabs 15s. This makes it possible to smoothly vary an equivalent refractive index (indicative of an effective refractive index of a micro-waveguide) between the channel waveguide 15a and the first core 12.

Therefore, according to the light combining/dividing element 10, it is possible to suppress Fresnel reflection that occurs at an interface at which an equivalent refractive index varies greatly, and accordingly possible to suppress generation of reflected light which can be generated in the light combining/dividing element 10. That is, according to the light combining/dividing element 10, it is possible to suppress Fresnel reflection which occurs in the MMI part 15, and accordingly possible to suppress light loss resulting from the Fresnel reflection, as compared with a light combining/dividing element in which an MMI part does not have a slab, such as the light combining/dividing element disclosed in each of Patent Literatures 1 and 2.

(Materials of Core 11 and Cladding 21)

In a case where the light combining/dividing element 10 in accordance with Embodiment 1 employs the core 11 which is made of silicon, the light combining/dividing element 10 can be produced with use of a silicon-on-insulator (SOI) substrate.

In this case, it is only necessary that (i) a buried oxide layer (BOX layer) of the SOI substrate be used as the lower cladding 21a and (ii) a silicon layer formed on the BOX layer be patterned into a shape of the core 11. Note that, by carrying out etching twice with use of respective differently patterned masks, it is possible to form (i) thicker parts of the core 11 (i.e., the first core 12, the second core 13, the third core 14, the channel waveguide 15a, and the rib 15r) and (ii) thinner parts of the core 11 (i.e., the slabs 15s).

The upper cladding 21b, which surrounds the core 11, can be formed by laminating, on the lower cladding 21a and the core 11, an insulator, such as silica, having a refractive index lower than that of silicon.

Note that, in a case where the light combining/dividing element 10 is produced with use of an SOI substrate, a lower silicon layer (not illustrated in (a) of FIG. 1) is present under the lower cladding 21a.

To these processes for producing the light combining/dividing element 10, existing processes for producing a semiconductor light waveguide, that is, processes used in silicon photonics can be applied. Therefore, it is possible to produce the light combining/dividing element 10 at a production cost similar to that for producing a conventional semiconductor light waveguide. In other words, according to the light combining/dividing element 10, it is possible to suppress generation of reflected light without causing an increase in production cost.

Note that the semiconductor of which the core 11 is made is not limited to silicon, and can be, for example, indium phosphide. In this case, the lower cladding 21a is preferably made of a semiconductor obtained by doping indium phosphide with a dopant, and the upper cladding 21b is preferably made of any one of (i) a semiconductor obtained by doping indium phosphide with a dopant, (ii) silica, and (iii) air.

(Number of Cores Connected to Channel Waveguide 15a)

In Embodiment 1, the light combining/dividing element 10 has been described which is configured such that (i) the first core 12 is connected to the rib waveguide 15b of the MMI part 15 and (ii) the second core 13 and the third core 14 are connected to the channel waveguide 15a of the MMI part 15, that is, which is configured such that the core 11 is a 1×2 core.

Note, however, that the core 11 is not limited to such a 1×2 core, and can be alternatively a 1×M core (M is an integer of 3 or more).

In a case where a 1×M core is employed as the core 11, the core 11 only needs to be configured so as to include (1) the first core 12, (2) second through N-th (N=M+1) cores each having a thickness equal to that of the first core 12, the second through N-th cores being arranged in parallel to each other, and (3) the MMI part 15 including the channel waveguide 15a and the rib waveguide 15b, the MMI part 15 being located between (i) the first core 12 and (ii) the second through N-th cores. The channel waveguide 15a only needs to be configured so as to be connected to each of the second through N-th cores, and configured such that the width W1 thereof is greater than a sum of respective widths of parts of the second through N-th cores which parts are connected to the second end surface.

[Variations]

Variations of the core 11 included in the light combining/dividing element 10 in accordance with Embodiment 1 will be described below with reference to FIG. 3. Note that, for convenience, identical reference numerals will be given to respective members having functions identical to those of members of the light combining/dividing element 10 in accordance with Embodiment 1, and descriptions of such members will be omitted. The core 11 included in the light combining/dividing element 10 can be replaced with any one of cores 31, 41, and 51 to be described as Variations 1 through 4.

(a) of FIG. 3 is a top view illustrating a configuration of a core 31 which is Variation 1 of the core 11. (b) of FIG. 3 is a top view illustrating a configuration of a core 31 which is Variation 2 of the core 11 and which is a variation of the core 31 illustrated in (a) of FIG. 3. (c) of FIG. 3 is a top view illustrating a configuration of a core 41 which is Variation 3 of the core 11. (d) of FIG. 3 is a top view illustrating a configuration of a core 51 which is Variation 4 of the core 11.

(Variation 1)

An MMI part 35 of the core 31 in accordance with Variation 1 includes a channel waveguide 15a and a rib waveguide 35b. Note that the rib waveguide 35b is a member similar to the rib waveguide 15b illustrated in (b) of FIG. 1, and includes a rib 35r and slabs 35s. As illustrated in (a) of FIG. 3, the core 31 in according with Variation 1 is different from the core 11 in the following points. That is, the core 31 is configured such that (1) a first core 12 has a first tapered part 321 at one of ends of the first core 12 (which one is connected to the rib waveguide 35b), (2) a second core 13 has a second tapered part 331 at one of ends of the second core 13 (which one is connected to the channel waveguide 15a), and (3) a third core 14 has a third tapered part 341 at one of ends of the third core 14 (which one is connected to the channel waveguide 15a).

(First Tapered Part 321)

The first tapered part 321 is a core of a channel type, and its cross section, perpendicular to a direction in which light is guided, has a quadrangular shape. A width Wc1 of the first tapered part 321 of the first core 12 continuously becomes greater, as the first tapered part 321 extends toward a boundary between the first core 12 and the rib waveguide 35b (that is, toward a first end surface of the MMI part 35).

Since the width Wc1 of part of the first core 12 which part is connected to the first end surface is thus increased, a width Wr of part of the rib 35r which part corresponds to the first end surface is accordingly increased so as to be equal to the width Wc1 of part of the first tapered part 321 which part is connected to the first end surface.

A difference in effective refractive index between (i) part, other than the first tapered part 321, of the first core 12 and (ii) the rib 35r is reduced by an effective refractive index of the first tapered part 321. It is therefore possible to suppress light loss resulting from light reflection caused by connecting the first core 12 to the rib 35r.

In a case where the width of part of the first core 12 of Variation 1 which part is uniform in width is set so as to be equal to that of the first core 12 of Embodiment 1, this results in that the width of part of the first tapered part 321 which part is connected to the first end surface is greater than that of the first core 12 of Embodiment 1. Therefore, in this case, the width Wr of part of the rib 35r which part corresponds to the first end surface only needs to be set so as to be greater than that of the first core 12 of Embodiment 1.

In a case where the width Wr of the rib 35r of the rib waveguide 35b is set so as to be equal to the width Wr of the rib 15r of the rib waveguide 15b of Embodiment 1, the width of the part of the first core 12 of Variation 1, which part is uniform in width, only needs to be set so as to be narrower than that of the first core 12 of Embodiment 1.

(Second Tapered Part 331, Third Tapered Part 341)

The second tapered part 331 is a core of a channel type, and its cross section, perpendicular to the direction in which light is guided, has a quadrangular shape, as with the case of the first tapered part 321. A width Wc2 of the second tapered part 331 of the second core 13 continuously becomes greater, as the second tapered part 331 extends toward a boundary between the second core 13 and the channel waveguide 15a (that is, toward a second end surface of the MMI part 35).

The third tapered part 341 is a core of a channel type, and its cross section, perpendicular to the direction in which light is guided, has a quadrangular shape, as with the case of the first tapered part 321 and the second tapered part 331. A width Wc3 of the third tapered part 341 of the third core 14 continuously becomes greater, as the third tapered part 341 extends toward a boundary between the third core 14 and the channel waveguide 15a (that is, toward the second end surface of the MMI part 35).

According to the above configuration, it is possible to (i) suppress, at a boundary between the second core 13 and the channel waveguide 15a, discontinuity of the width of the second core 13 (that is, stepwise narrowing of the width of the second core 13) and (ii) suppress, at a boundary between the third core 14 and the channel waveguide 15a, discontinuity of the width of the third core 14 (that is, stepwise narrowing of the width of the third core 14), as compared with the core 11 of Embodiment 1. Therefore, according to a light combining/dividing element 10 which employs the core 31 of Variation 1, it is possible to also suppress light loss.

In Variation 1, such a configuration has been described that (i) the first tapered part 321 is formed between the first core 12 and the rib waveguide 35b, (ii) the second tapered part 331 is formed between the second core 13 and the channel waveguide 15a, and (iii) the third tapered part 341 is formed the third core 14 and the channel waveguide 15a. Note, however, that merely the first tapered part 321 can be applied to the core 11 of Embodiment 1 or merely the second tapered part 331 and the third tapered part 341 can be alternatively applied to the core 11 of Embodiment 1. In view of maintaining symmetry between the second core 13 and the third core 14, it is not preferable to apply merely one of the second tapered part 331 and the third tapered part 341 to the core 11 of Embodiment 1.

(Variation 2)

As illustrated in (b) of FIG. 3, a rib waveguide 35b of the core 31 can include (i) a rib waveguide 35b1 corresponding to the rib waveguide 35b illustrated in (a) of FIG. 3 and (ii) a connecting part 35b2 located at one of ends of the rib waveguide 35b which one is connected to a first core 12 (which one is located in a negative direction of a y-axis among a coordinate system illustrated in (b) of FIG. 3). The connecting part 35b2 is a rib waveguide continuing to the rib waveguide 35b1. A width Wr of part of a rib 35r which part is included in the connecting part 35b2 is uniform.

In this manner, the width Wr of the rib 35r of the rib waveguide 35b only needs to be arranged so as to become narrower from a width equal to that of a channel waveguide 15a to a width equal to that of part of the first core 12 which part is located at a boundary between the first core 12 and the rib 35r, as the rib 35r extends toward the first core 12. In other words, the rib waveguide 35b can include a part in which the width of the rib 35r is uniform.

(Variation 3)

As illustrated in (c) of FIG. 3, a rib waveguide 45b of an MMI part 45 of the core 41 of Variation 3 can include (i) a rib waveguide 45b1 corresponding to the rib waveguide 15b illustrated in (b) of FIG. 1 and (ii) a connecting part 45b2 located at one of ends of the rib waveguide 45b which one is connected to a first core 12 (which one is located in a negative direction of a y-axis among a coordinate system illustrated in (c) of FIG. 3). The connecting part 45b2 is a rib waveguide continuing to the rib waveguide 45b1. A width Wr of part of a rib 45r which part is included in the connecting part 45b2 is uniform.

A width Ws of part of each of slabs 45s which part is included in the connecting part 45b2 becomes narrower so that ultimately Ws=0 (zero) at a boundary between the connecting part 45b2 and the first core 12, as the part of the each of the slabs 45s extends from a boundary between the connecting part 45b2 and the rib waveguide 45b1 toward the first core 12. In Variation 3, as the part of the each of slabs 45s extends from the boundary between the connecting part 45b2 and the rib waveguide 45b1 to the boundary between the connecting part 45b2 and the first core 12, the width Ws of the part of the each of the slabs 45s linearly becomes narrower. In other words, the width Ws of the part of the each of the slabs 45s is represented as a linear function of a distance from the boundary between the connecting part 45b2 and the rib waveguide 45b1 which linear function exhibits a negative slope.

Namely, the width Ws is arranged such that (1) Ws=0 (zero) at a boundary between the rib waveguide 45b and a channel waveguide 15a and at a boundary between the rib waveguide 45b and the first core 12, (2) the width Ws has a maximum value at the boundary between the rib waveguide 45b1 and the connecting part 45b2 of the rib waveguide 45b (in Claims, corresponding to any position located between (i) the boundary between the rib waveguide 45b and the channel waveguide 15a and (ii) the boundary between the rib waveguide 45b and the first core 12), and (3) the width Ws continuously varies across the rib waveguide 45b.

According to the above configuration, it is possible to smoothly connect, at a boundary between the rib 45r and the channel waveguide 15a, the rib waveguide 45b to the channel waveguide 15a. In addition, it is also possible to smoothly connect, at a boundary between the rib 45r and the first core 12, the rib waveguide 45b to the first core 12.

Therefore, according to a light combining/dividing element 10 which employs the core 41 of Variation 3, it is possible to further suppress Fresnel reflection which can occur at the boundary between the first core 12 and the rib waveguide 45b, and accordingly possible to further suppress light loss, as compared with the light combining/dividing element 10 which employs the core 11 of Embodiment 1.

(Variation 4)

As illustrated in (d) of FIG. 3, the core 51 of Variation 4 can be obtained by replacing the MMI part 15 of the core 11 of Embodiment 1 with an MMI part 55. The MMI part 55 includes a channel waveguide 15a and a rib waveguide 55b.

The rib waveguide 55b corresponds to the rib waveguide 15b illustrated in FIG. 1, and is divided into a first rib waveguide 55b1 and a second rib waveguide 55b2.

The core 11 illustrated in (b) of FIG. 1 is configured such that the width Wr of the rib 15r of the rib waveguide 15b becomes narrower, as the rib 15r extends from the boundary between the channel waveguide 15a and the rib waveguide 15b to the boundary between the rib waveguide 15b and the first core 12. How the width Wr of the rib 15r becomes narrower is represented by a single slop across the rib waveguide 15b. On the other hand, according to the core 51 of Variation 4, how a width Wr of a rib 55r of the rib waveguide 55b becomes narrower is represented by two slopes set with respect to the respective first and second rib waveguides 55b1 and 55b2.

Note that the number of parts into which the rib waveguide 55b is divided is not limited to two. That is, the rib waveguide 55b can be divided into three or more rib waveguides, and how the width Wr of the rib 55r of the rib waveguide 55b becomes narrower can be represented by three or more slops set with respect to the respective three or more rib waveguides.

In a case where the number of the parts into which the rib waveguide 55b is divided is increased to an utmost limit, the width Wr of the rib 55r can be represented as a function of a distance from a boundary between the rib waveguide 55b and the channel waveguide 15a which function forms a curve (for example, a quadratic function or the like).

A width Ws of each of slabs 55s is arranged such that (1) Ws=0 (zero) at the boundary between the rib waveguide 55b and the channel waveguide 15a and at a boundary between the rib waveguide 55b and a first core 12, (2) the width Ws has a maximum value at a middle part of the rib waveguide 55b (any position located between (i) the boundary between the rib waveguide 55b and the channel waveguide 15a and (ii) the boundary between the rib waveguide 55b and the first core 12), and (3) the width Ws continuously varies across the rib waveguide 55b. That is, a width Wr+Ws+Ws, which is a sum of the width Wr of the rib 55r and respective widths Ws of the slabs 55s, is arranged so as to (1) be equal, at the boundary between the rib waveguide 55b and the channel waveguide 15a, to a width W1 of the channel waveguide 15a, (2) be equal, at the boundary between the rib waveguide 55b and the first core 12, to a width Wc1 of the first core 12, and (3) smoothly become narrower as the rib 55r and the slabs 55s extend from the boundary between the rib waveguide 55b and the channel waveguide 15a to the boundary between the rib waveguide 55b and the first core 12. In Variation 4, as the rib 55r and the slabs 55s extend from the boundary between the rib waveguide 55b and the channel waveguide 15a to the boundary between the rib waveguide 55b and the first core 12, the width Wr+Ws+Ws quadratically becomes narrower.

According to the core 11 of Embodiment 1, as each of the slabs 15s extends from the boundary between the rib waveguide 15b and the channel waveguide 15a to the boundary between the rib waveguide 15b and the first core 12, the width Ws of the each of the slabs 15s gradually becomes greater, and ultimately Ws=0 (zero) at the boundary the rib waveguide 15b and the first core 12. That is, the width Ws of the each of the slabs 15s is discontinuous (that is, the width Ws becomes narrower stepwise) at the boundary the rib waveguide 15b and the first core 12.

On the other hand, according to the core 51 of Variation 4, as each of the slabs 55s extends from the boundary between the rib waveguide 55b and the channel waveguide 15a to the boundary between the rib waveguide 55b and the first core 12, the width Ws of the each of the slabs 55s gradually becomes greater, has a maximum value, and then gradually becomes narrower. Therefore, according to the core 51, it is possible to suppress discontinuity of the width Ws of the each of the slabs 55s (that is, stepwise narrowing of the width Ws of the each of the slabs 55s). Therefore, according to a light combining/dividing element 10 which employs the core 51 of Variation 4, it is possible to suppress generation of reflected light, and accordingly possible to also suppress light loss, as compared with the light combining/dividing element 10 which employs the core 11 of Embodiment 1.

EXAMPLE

Example of the light combining/dividing element 10 in accordance with Embodiment 1 will be described below with reference to FIG. 4. A light combining/dividing element 10 in accordance with the present Example was configured as follows.

Silicon was employed as a semiconductor of which a core 11 was made. Silica was employed as an insulator of which a cladding 21 (a lower cladding 21a and an upper cladding 21b) was made.

A thickness tc of each of a first core 12, a second core 13, and a third core 14, a thickness of a channel waveguide 15a, and a thickness tr of a rib 15r were each set to 200 nm.

A thickness ts of each of slabs 15s was set to 95 nm.

A width Wc of each of the first core 12, the second core 13, and the third core 14 was set to 600 nm.

A width W1 of the channel waveguide 15a (that is, a width of an MMI part 15) was set to 1.7 μm.

A length L of the MMI part 15 was set to 2.5 μm.

A length L2 of a rib waveguide 15b of the light combining/dividing element 10 thus configured was varied in a range of 0 (zero) μm≤L2≤2.5 μm, and then a reflectance of the light combining/dividing element 10 was calculated. The reflectance of the light combining/dividing element 10 was calculated as follows. That is, a TE0-polarized wave having a frequency of 193.5 THz was caused to enter the second core 13, and a TE0-polarized wave caused to exit from the third core 14 was calculated. Thereafter, the reflectance was calculated from a proportion of power of the TE0-polarized wave caused to exit from the third core 14 to power of the TE0-polarized wave caused to enter the second core 13.

Figure 4:
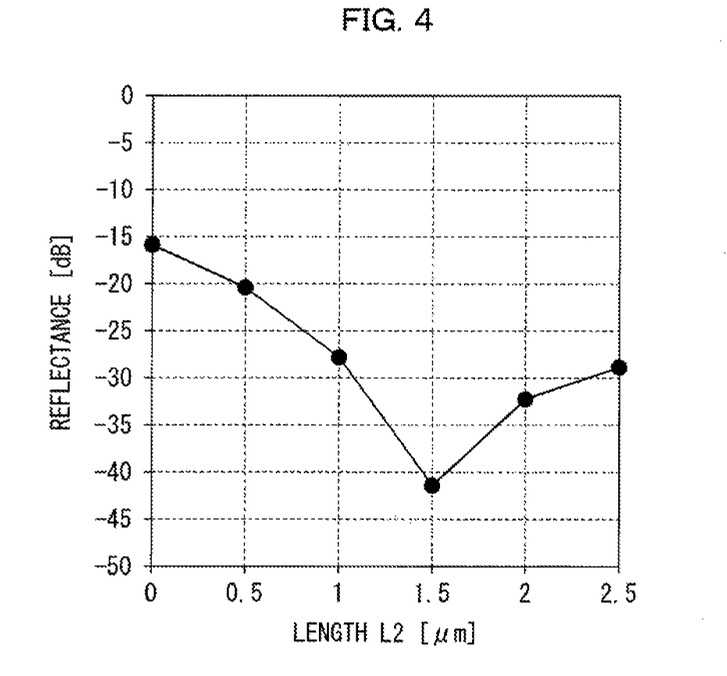
FIG. 4 is a graph created by plotting a reflectance of a light combining/dividing element of Example of the present invention which reflectance varied depending on a length L2.

FIG. 4 is a graph created by plotting the reflectance of the light combining/dividing element 10 of the present Example which reflectance varied depending on the length L2. As is clear from FIG. 4, it was found that, in a case where the length L2 of the rib waveguide 15b was increased while the length L of the MMI part 15 was left unchanged, the reflectance was decreased, and then increased when L2=1.5 μm. That is, it was found that, in a case where L2=1.5 μm while L=2.5 μm, the light combining/dividing element 10 had the lowest reflectance.

Therefore, a proportion of the length L2 to the length L is preferably not less than 50% and not more than 70%.

[Embodiment 2]

Figure 5:
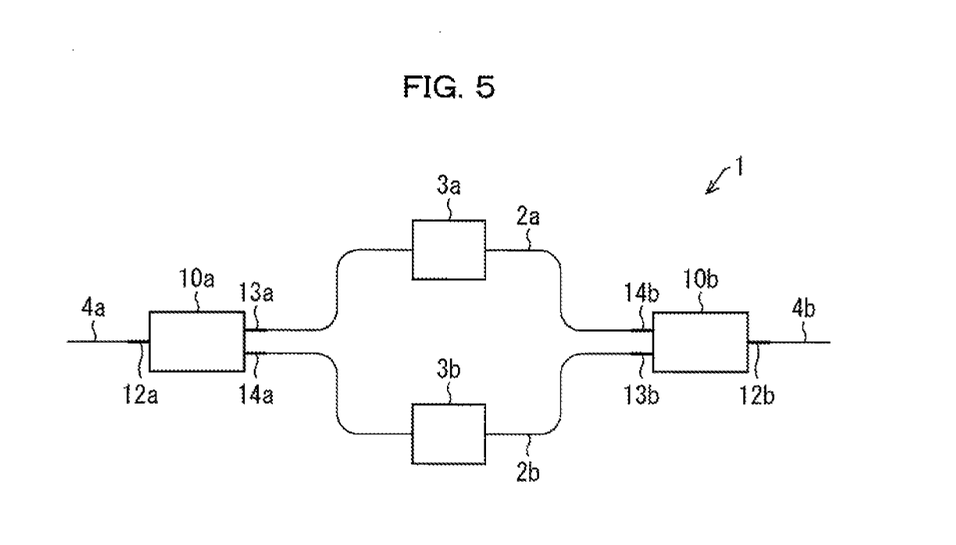
FIG. 5 is a block diagram illustrating a configuration of a light modulator in accordance with Embodiment 2 of the present invention.

The following description will discuss, with reference to FIG. 5, a light modulator 1 in accordance with Embodiment 2 of the present invention. FIG. 5 is a block diagram illustrating a configuration of the light modulator 1 in accordance with Embodiment 2.

The light modulator 1 is a light modulator of a Mach-Zehnder type, and includes (i) a pair of arms and (ii) a light modulating section inserted in at least one of the pair of arms. The light modulator 1 further includes (i) a light combining/dividing element 10 (first light combining/dividing element 10a) of Embodiment 1, as a light dividing element, which divides a ray of light into rays of light to be caused to enter the respective pair of arms and (ii) a light combining/dividing element 10 (second light combining/dividing element 10b) of Embodiment 1, as a light combining element, which combines the rays of light, having been caused to enter the respective pair of arms, into a ray of light.

In Embodiment 2, the light modulator 1 will be described, as an example, which is configured such that (i) the pair of arms are made up of a first arm 2a and a second arm 2b, (ii) a first light modulating section 3a is inserted in the first arm 2a, and (iii) a second light modulating section 3b is inserted in the second arm 2b.

Each of the first arm 2a, the second arm 2b, the first light modulating section 3a, and the second light modulating section 3b includes a core which is made of a semiconductor (for example, silicon), as with the case of a core 11 of each of the light combining/dividing elements 10. The each of the first arm 2a, the second arm 2b, the first light modulating section 3a, and the second light modulating section 3b further includes a cladding which is made of a material identical to that of a cladding 21 of the each of the light combining/dividing elements 10 (for example, in a case where the core is made of silicon, the cladding is made of silica).

(Light Modulator 1)

As illustrated in FIG. 5, the light modulator 1 includes the first arm 2a, the first light modulating section 3a inserted in the first arm 2a, the second arm 2b, the second light modulating section 3b inserted in the second arm 2b, the light combining/dividing element 10a, and the second light combining/dividing element 10b.

The light modulator 1 is capable of carrying out a similar modulating operation with respect to guided light, even in a case where a light guided direction is reversed. In Embodiment 2, light is caused to enter the light modulator 1 from a side thereof on which the first light combining/dividing element 10a is provided, and light is caused to exit from the a side thereof on which the second light combining/dividing element 10b is provided. That is, a core 4a connected to a first core 12a of the first light combining/dividing element 10a functions as a light-entering-side core, and a core 4b connected to a first core 12b of the second light combining/dividing element 10b functions as a light-exiting-side core.

A second core 13a of the first light combining/dividing element 10a is connected to one of ends of the first arm 2a, and a third core 14a of the first light combining/dividing element 10a is connected to one of ends of the second arm 2b. A third core 14b of the second light combining/dividing element 10b is connected to the other one of the ends of the first arm 2a, and a second core 13b of the second light combining/dividing element 10b is connected to the other one of the ends of the second arm 2b. As has been described, the first light modulating section 3a is inserted in the first arm 2a, and the second light modulating section 3b is inserted in the second arm 2b.

How to configure the first light modulating section 3a and the second light modulating section 3b is not limited in particular. For example, as each of the first light modulating section 3a and the second light modulating section 3b, a light modulating section can be employed which is configured such that a p-n junction, where a p-type semiconductor region and an n-type semiconductor region are joined to each other, is formed in part of a core. Alternatively, a light modulating section can be employed which is configured such that a p-i-n junction, where a p-type semiconductor region and an n-type semiconductor are joined to each other via an intrinsic semiconductor region, is formed in part of a core. Alternatively, a light modulating section can be employed which is configured such that a p-i-p junction, where a p-type semiconductor region and a p-type semiconductor region are joined to each other via an intrinsic semiconductor region, is formed in part of a core. Alternatively, a light modulating section can be employed which is configured such that an n-i-n junction, where an n-type semiconductor region and an n-type semiconductor region are joined to each other via an intrinsic semiconductor region, is formed in part of a core.

The first light combining/dividing element 10$a$ functions as a light dividing element, and divides a ray of light, having been guided through the core 4$a$, into (i) a ray of light to be guided through the first arm 2$a$ and (ii) a ray of light to be guided through the second arm 2$b$. The first light modulating section 3$a$ carries out phase modulation with respect to the ray of light guided through the first arm 2$a$, and the second light modulating section 3$b$ carried out phase modulation with respect to the ray of light guided through the second arm 2$b$. The second light combining/dividing element 10$b$ functions as a light combining element, and combines, into a ray of light to be guided through the core 4$b$, (i) the ray of light which has been subjected to the phase modulation by the first light modulating section 3$a$ and has been guided through the first arm 2$a$ and (ii) the ray of light which has been subjected to the phase modulation by the second light modulating section 3$b$ and has been guided through the second arm 2$b$.

According to the light modulator 1 thus configured, respective cores of the first light combining/dividing element 10$a$, the second light combining/dividing elements 10$b$, the first arm 2$a$, the second arm 2$b$, the first light modulating section 3$a$, and the second light modulating section 3$b$ (that is, a core of the light modulator 1) are made of an identical semiconductor, and respective claddings of the first light combining/dividing element 10$a$, the second light combining/dividing elements 10$b$, the first arm 2$a$, the second arm 2$b$, the first light modulating section 3$a$, and the second light modulating section 3$b$ (that is, a cladding of the light modulator 1) are made of an identical material. This allows a plurality of light modulators 1 to be integrated on an identical substrate. It is therefore possible to reduce a size of a device which employs a plurality of light modulators 1.

Furthermore, in a case where (i) silicon is employed as a material of the core of the light modulator 1 and (ii) silica is employed as a material of the cladding of the light modulator 1, it is possible to produce the light modulator 1, with use of an SOI substrate, by applying processes used in silicon photonics. It is therefore possible to reduce a size of a device which employs a plurality of light modulators 1, without causing an increase in production cost.

A light combining/dividing element in accordance with an aspect of the present invention is preferably arranged such that: each of the second through N-th cores has a tapered part at one of ends of the each of the second through N-th cores which one is connected to the channel waveguide; and a width of the tapered part continuously becomes greater, as the tapered part extends toward the second end surface.

The light combining/dividing element in accordance with an aspect of the present invention is preferably arranged such that: the first core has a tapered part at one of ends of the first core which one is connected to the rib waveguide; and a width of the tapered part continuously becomes greater, as the tapered part extends to the first end surface.

According to the above configuration, it is possible to (i) suppress, at a boundary between each of the second through N-th cores and the channel waveguide, discontinuity of a width of the each of the second through N-th cores (that is, stepwise narrowing of the width of the each of the second through N-th cores) or (ii) suppress, at a boundary between the first core and the rib waveguide, discontinuity of a width of the first core (that is, stepwise narrowing of the width of the first core). Therefore, by thus suppressing generation of reflected light which can be generated at such a boundary, it is possible to also suppress light loss.

The light combining/dividing element in accordance with an aspect of the present invention is preferably arranged such that: a width of each of the slabs has a value of 0 (zero) at a boundary between the channel waveguide and the rib waveguide, and has a maximum value at any position located between (i) the boundary between the channel waveguide and the rib waveguide and (ii) a boundary between the first core and the rib waveguide.

According to the above configuration, it is possible to smoothly connect, at a boundary between the rib and the channel waveguide, the rib waveguide to the channel waveguide. It is therefore possible to further suppress Fresnel reflection which can occur at the boundary between the channel waveguide and the rib waveguide, and accordingly possible to further suppress generation of reflected light.

The light combining/dividing element in accordance with an aspect of the present invention is preferably arranged such that: a width of each of the slabs has a value of 0 (zero) at a boundary between the channel waveguide and the rib waveguide and at a boundary between the first core and the rib waveguide, and continuously varies across the rib waveguide.

According to the above configuration, it is possible to smoothly connect, at the boundary between the rib and the channel waveguide, the rib waveguide to the channel waveguide. In addition, it is possible to smoothly connect, at the boundary between the rib and the first core, the rib waveguide to the first core. Therefore, it is possible to further suppress Fresnel reflection which can occur at the boundary between the first core and the rib waveguide, and accordingly possible to further suppress generation of reflected light.

A light modulator in accordance with an aspect of the present invention is preferably a light modulator of a Mach-Zehnder type, including: a pair of arms; a light modulating section inserted in at least one of the pair of arms; a first light combining/dividing element in accordance with an aspect of the present invention, the first light combining/dividing element serving as a light dividing element and dividing a ray of light into rays of light to be caused to enter the respective pair of arms; and a second light combining/dividing element in accordance with an aspect of the present invention, the second light combining/dividing element serving as a light combining element and combining the rays of light, having been caused to enter the respective pair of arms, into a ray of light.

According to the above configuration, it is possible to bring about an effect similar to that brought about by the light combining/dividing element in accordance with an aspect of the present invention.

The present invention is not limited to the embodiments, but can be altered by a skilled person in the art within the scope of the claims. An embodiment derived from a proper combination of technical means each disclosed in a different embodiment is also encompassed in the technical scope of the present invention.

INDUSTRIAL APPLICABILITY

The present invention can be used for a light combining/dividing element including a core made of a semiconductor. Furthermore, the present invention can be used for a light modulator including such a light combining/dividing element.

REFERENCE SIGNS LIST

10 Light combining/dividing element
11, 31, 41, 51 Core
12 First core
13 Second core
14 Third core
321, 331, 341 First tapered section, second tapered section, third tapered section
15, 35, 45, 55 MMI part
15a Channel waveguide
15b, 35b, 45b, 55b Rib waveguide
15r, 35r, 45r, 55r Rib
15s, 35s, 45s, 55s Slab
21 Cladding
21a Lower cladding
21b Upper cladding
1 Light modulator
2a, 2b First arm, second arm (a pair of arms)
3a, 3b First light modulating section, second light modulating section
10a, 10b First light combining/dividing element, second light combining/dividing element

The invention claimed is:

1. A light combining/dividing element, comprising:
a core made of a semiconductor,
the core including:
 a first core;
 second through N-th cores each having a thickness equal to that of the first core, the second through N-th cores being arranged in parallel to each other; and
 an multi-mode interference (MMI) part having a first end surface and a second end surface, the first end surface being connected to the first core, the second end surface facing the first end surface and being connected to each of the second through N-th cores,
the MMI part including:
 a channel waveguide including the second end surface, the channel waveguide having a width greater than a sum of respective widths of the second through N-th cores; and
 a rib waveguide including the first end surface, the rib waveguide including (i) a rib having a thickness equal to that of each of the first through N-th cores and (ii) slabs each having a thickness thinner than that of the rib,
the rib having a width which becomes narrower from a width equal to that of the channel waveguide to a width equal to that of part of the first core which part is located at a boundary between the first core and the rib,
wherein a width of each of the slabs has a value of 0 (zero) at a boundary between the channel waveguide and the rib waveguide and at a boundary between the first core and the rib waveguide.

2. The light combining/dividing element as set forth in claim 1, wherein:
each of the second through N-th cores has a tapered part at one of ends of the each of the second through N-th cores which one is connected to the channel waveguide; and
a width of the tapered part continuously becomes greater, as the tapered part extends toward the second end surface.

3. The light combining/dividing element as set forth in claim 1, wherein:
the first core has a tapered part at one of ends of the first core which one is connected to the rib waveguide; and
a width of the tapered part continuously becomes greater, as the tapered part extends to the first end surface.

4. The light combining/dividing element as set forth in claim 1, wherein:
the width of each of the slabs has a maximum value at any position located between (i) the boundary between the channel waveguide and the rib waveguide and (ii) a boundary between the first core and the rib waveguide.

5. The light combining/dividing element as set forth in claim 1, wherein:
the width of each of the slabs continuously varies across the rib waveguide.

6. A light modulator of a Mach-Zehnder type, comprising:
a pair of arms;
a light modulating section inserted in at least one of the pair of arms;
a first light combining/dividing element recited in claim 1, the first light combining/dividing element serving as a light dividing element and dividing a ray of light into rays of light to be caused to enter the respective pair of arms; and
a second light combining/dividing element recited in claim 1, the second light combining/dividing element serving as a light combining element and combining the rays of light, having been caused to enter the respective pair of arms, into a ray of light.

* * * * *